UNITED STATES PATENT OFFICE.

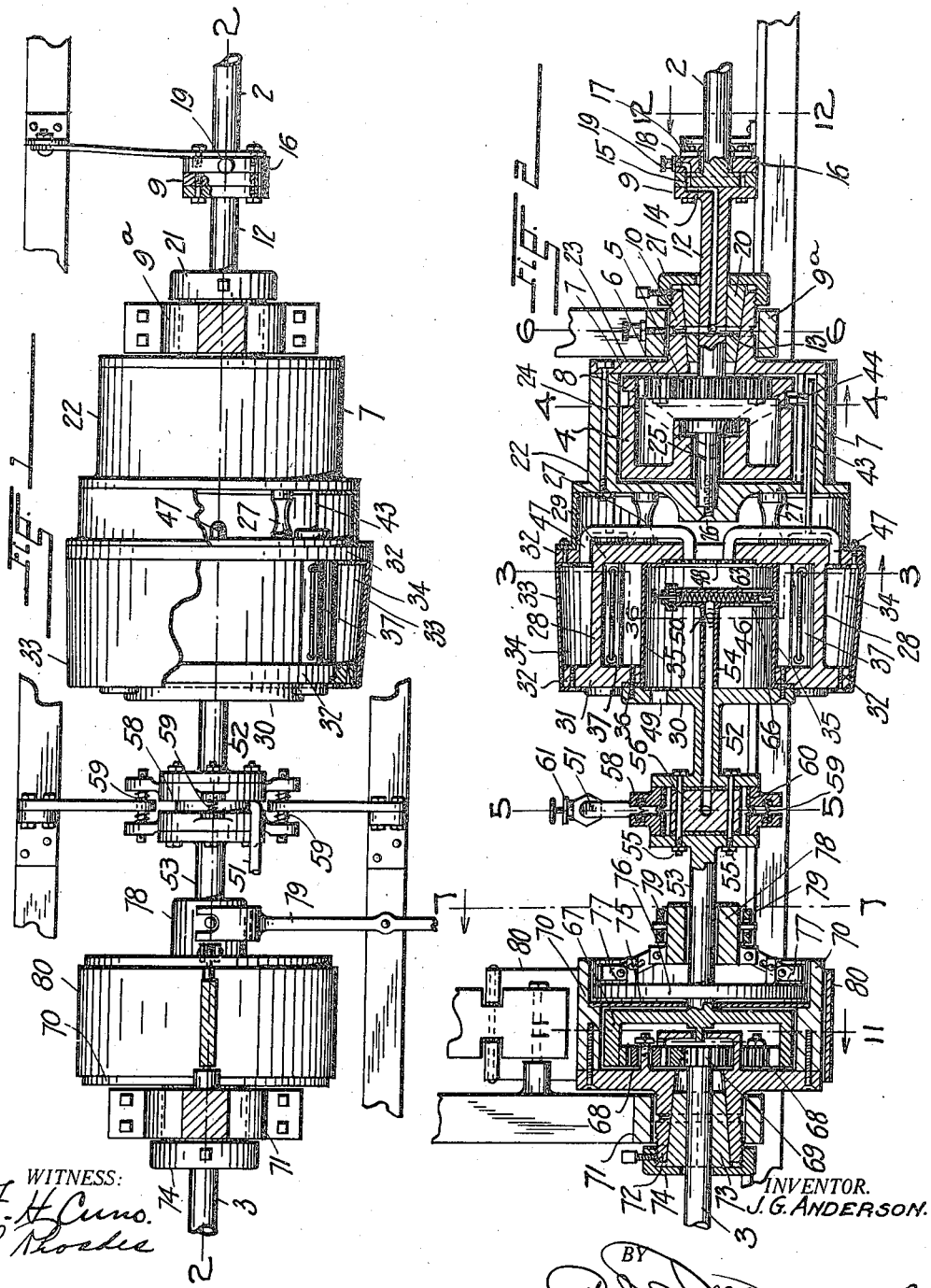

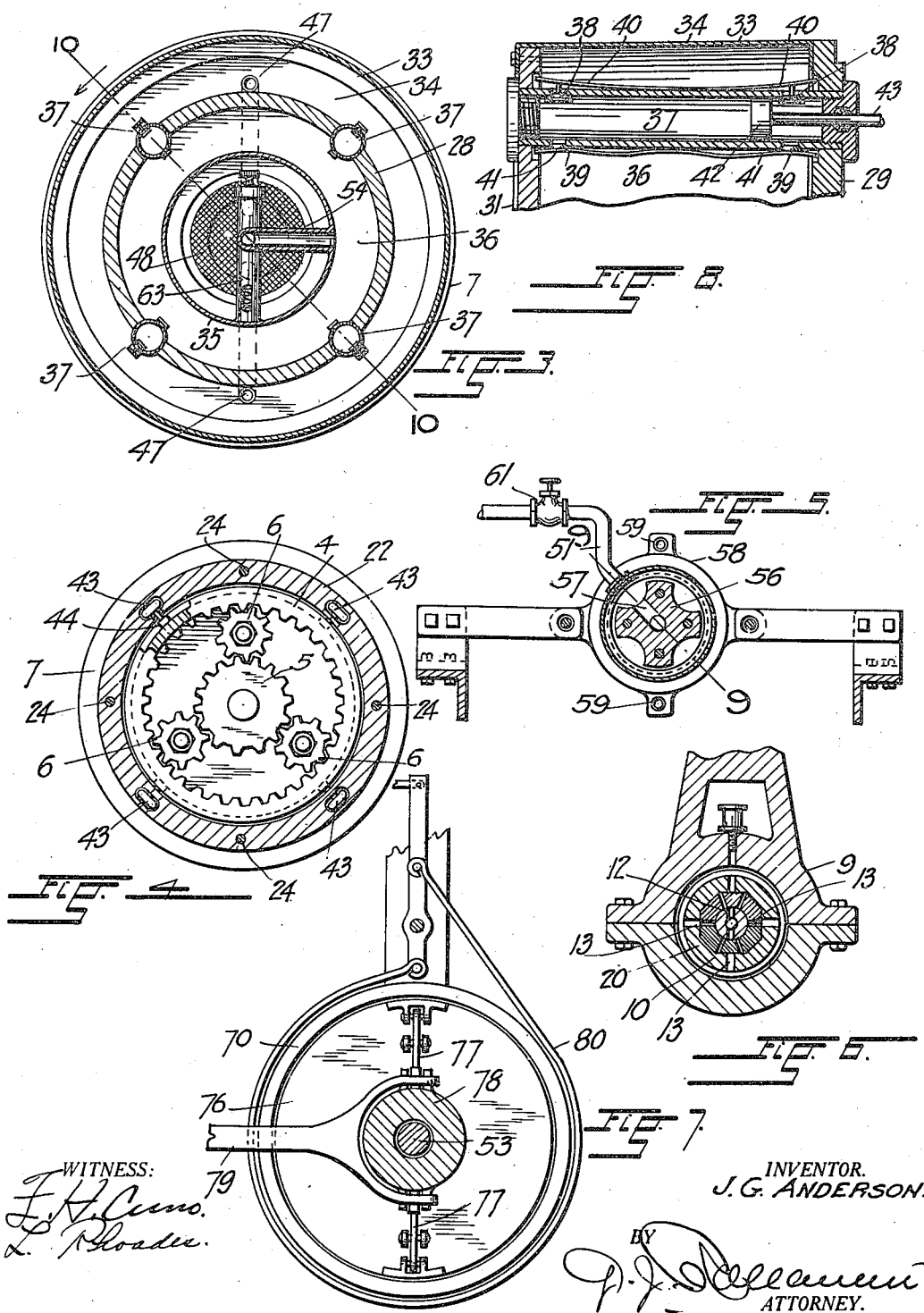

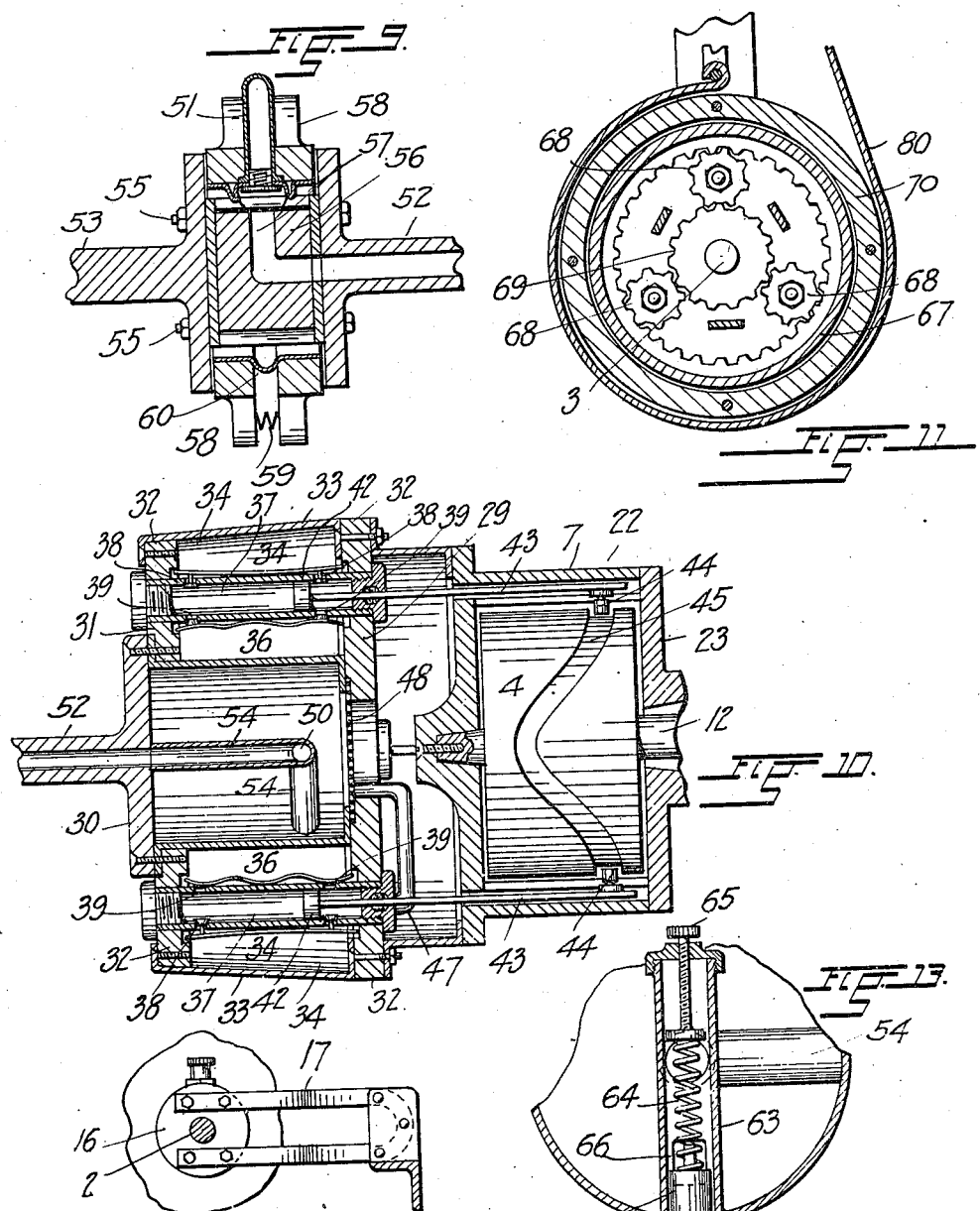

JOHN G. ANDERSON, OF WHEAT RIDGE, COLORADO.

ROTARY TRANSMISSION.

1,271,827.   Specification of Letters Patent.   Patented July 9, 1918.

Application filed May 14, 1917. Serial No. 168,527.

*To all whom it may concern:*

Be it known that I, JOHN G. ANDERSON, a subject of Gustaf V, King of Sweden, having declared my intention to become a citizen of the United States, residing at Wheat Ridge, in the county of Jefferson and State of Colorado, have invented certain new and useful Improvements in Rotary Transmission, of which the following is a specification.

This invention relates to power transmitting mechanism and its primary object is to provide a mechanism of this character which operates by the rotation of its coöperative parts to convert the power generated by a motor, into a rotary movement of a driven element at any desired degree of velocity.

Another object of my invention is to provide in transmission mechanism a compensating medium which automatically varies its movement-transmitting action in accordance with the resistance offered by the load and thereby relieves the motor with which it is associated, from strains resulting from an overload or suddenly increased resistance to its driving action, and still another object of my invention is to provide in a transmission of the hereinbefore described type, means for reversing or discontinuing the relative movement of the driving element to which it is applied.

The above and other objects, all of which will fully appear in the course of the following description, I attain by the arrangement of parts, combinations of devices and features of construction hereinafter explained and shown in their preferred form in the accompanying drawings in the various views of which like parts are similarly designated and in which, Figure 1 is a partially sectional plan view of the improved transmission mechanism, Fig. 2, a section taken along the line 2—2, Fig. 1, Fig. 3, a transverse section along the line 3—3, Fig. 2, Fig. 4, a similar section taken along the line 4—4, Fig. 2, Fig. 5, a similar section along the line 5—5, Fig. 2, Fig. 6, a section taken along the line 6—6, Fig. 2, Fig. 7, a section taken along the line 7—7, Fig. 2 looking in the direction of the arrow drawn across said line, Fig. 8, a longitudinal section through one of the cylinders of the air-compressor included in the mechanism, Fig. 9, an enlarged section of the connection of the shaft sections between the compressor element of the transmission and the element which connects the same with the driven element, Fig. 10, a section along the line 10—10 Fig. 3, Fig. 11, a section taken along the line 11—11, Fig. 2, Fig. 12, a section taken along the line 12—12, Fig. 2, looking in the direction of the arrow drawn across said line, and Fig. 13 an enlarged section of the escape valve shown in Fig. 3.

Referring more specifically to the drawings, the reference numeral 2 designates a rotary shaft which is connected with a motor or other source of motive power, and 3 a rotary shaft which by any suitable means is operatively connected with the driven element.

While by reason of its compensating properties my improved transmission is particularly adapted for use in transmitting the power generated by an internal combustion engine to a rotary element such as the live axle of a motor-driven vehicle, it may be effectively employed to transmit power and motion in connection with different devices, and in the following description the shaft 2 which as mentioned hereinbefore is connected with the source of motive energy will be referred to as the driving shaft or driving element, while the shaft 3 which connects with the actuated device is called the driven shaft or driven element.

Principal among the essential parts of my transmission mechanism are two rotary elements the rotative continuity of which is established by a body of air under compression.

One of these elements is connected with the driving shaft, while the other element has an operative connection with the driven shaft.

The last-mentioned element includes in its construction a clutch mechanism which not only is adapted to break the rotative continuity of the driven element with the transmission at any time in the operation of the same, but which also operates to reverse the direction of rotation of the driven shaft relative to the movement of the part of the transmission with which it is directly associated.

The element which connects with the driven shaft comprises a rotary drum cam 4 which is connected with the driving shaft for conjunctive rotation at a reduced velocity and which in the movement of the transmission operates an air compressor included in the element which connects with the driven shaft.

The connection between the cam and the shaft is established through a planet-gearing consisting of a sunwheel 5 which is fixed on the driving shaft, and a plurality of planet wheels 6 of smaller diameter which are mounted on a cylindrical housing 7 in which the cam 4 is independently rotatably disposed.

The planet wheels of the gearing mesh with an internal gear 8 on the cam wheel and thus act as an intermediary for transmitting the rotary movement of the sun wheel to said wheel.

The connection between the gear-wheel 5 and the driving shaft is established by means of a flange coupling 9 and the housing 7 which incloses the cam 4 and which carries the intermediate pinions 6, is rotatably supported in a stationary bearing 9ᵃ by means of a hollow trunnion 10 through which the shaft 12 of the gear-wheel loosely extends.

To lubricate the contacting surfaces of the shaft 12 and the trunnion, the shaft is provided with an axial bore which connects at its ends with a plurality of registering transverse channels 13 in the shaft and the trunnion to convey the liquid lubricant to the engaging surfaces thereof.

The opposite end of the bore connects with a number of radiating ducts 14 in a flange of the gear shaft which connects by means of transverse passages 15 with a concentric groove in the outer face of a flange of the driving shaft 2.

A ring 16 loosely mounted upon the driving shaft is held in frictional engagement with the grooved face of its flange by means of a spring 17 and it has a passage 18 which registers with the groove at one of its ends and which at its outer end connects with an oil-cup 19.

A tapering sectional bushing 20 interposed between the gear-shaft and the trunnion 10 may be used to take up wear through the medium of a cap 21 which is screwed upon the end of the trunnion.

The housing 7 in which the drum cam has its movement is composed of a body member 22 and a cover member 23 connected by bolts 24.

The trunnion which supports the housing in the bearing 9 is part of the cover member and the cam 4 is rotatably supported upon a stud-shaft 25 which is secured to the body member by means of a screw 26.

Rigidly secured to the housing by means of studs 27 is an air-compressing element which in the operation generates the elastic movement-transmitting medium of the transmission.

The compression element consists of a hollow cylinder 28 closed at its inner end by a head 29 and at its opposite end by a cover 30 which is bolted upon an inwardly extending flange 31.

Circular flanges 32 extending outwardly from the cylinder at opposite ends thereof, form a support for a surrounding shell 33 which is rigidly attached to the flanges to provide an air intake-chamber 34.

A second cylindrical shell 35 is secured to the before-mentioned inturned flange 31 and the head 29 of the cylinder in spaced relation to the interior surface of the same, to provide a compressed air chamber 36 and a plurality of piston chambers 37 are arranged between these two chambers in recesses of the cylinder 28 which constitutes the annular partition between the chambers 34 and 36.

Each piston chamber 37 is provided at its opposite ends with intake ports 38 which connect with the intake chamber 34, and exhaust ports 39 which communicate with the air-chamber 36, and the passage of fluid through the different ports is controlled by means of spring-pressed valves 40 and 41.

Pistons 42 mounted for reciprocation in the piston chambers are fixed at the ends of rods 43 which extend through stuffing boxes at the forward ends thereof and which carry at their outer extremities anti-friction rollers 44 for their operative connection with the drum-cam 4.

The latter is to this end provided with a peripheral undulating groove 45 into which the rollers at the ends of the piston rods loosely extend, and the surrounding housing 7 is recessed and grooved to permit of the unrestricted reciprocating motion of the rods.

To prevent dust, dirt and other foreign substances from entering the compressor with the air, the air-chamber 36 which connects with the intake ports of the piston-chambers, is connected with the central space 46 of the compression element inside the shell 35, by means of a series of conduits 47 the inlet ends of which are covered by a screen 48, air from the atmosphere being admitted to the space 46 through a screen covered opening 49 in the cover 30.

When by rotation of the driving shaft the cam is rotated at a reduced rate of speed, the pistons are reciprocated in their respective chambers and the air drawn into the piston-chambers from the chamber 34 is in a compressed condition delivered into the chamber 36.

It will be seen that the body of air thus confined in the last-mentioned chamber, provides a resistance to the reciprocating movement of the pistons and that when this resistance becomes too great to permit of an unrestricted movement of the rollers on the piston rods through the cam groove, the cylinder upon which the piston chambers are mounted is through the medium of the compressed air-body compelled to rotate in conjunction with the cam and the driving shaft.

The chamber 36 of the compressor has an air-outlet 50 which is connected with a stationary valve-controlled conduit 51 by the following contrivance.

A shaft 52 on the cover of the compression element is axially alined with the gear shaft and with a shaft 53 which through the intermediary of a clutch and gearing hereinafter to be described, connects with the driven shaft 3.

The shaft 52 has an axial bore which is connected with the outlet opening of the compression chamber by means of an angular conduit 54. The shafts are flanged at their adjacent ends and between these flanges is secured by means of bolts 55 a block 56 which has an angular passage 57 in connection with the bore of the shaft 52.

Surrounding the block and loosely disposed between the outer portions of the two flanges is a casing 58 composed of two annular members which are held in air-tight contact with the flanges by interposed springs 59 and which are connected by an air-tight strip 60 of flexible material which closes the space betwen them.

The before-mentioned pipe 51 normally closed by a valve 61 is secured between the two members of the casing and extends into the space between the casing and the block 56.

The normal degree of density of the air-body in the chamber 36 is predetermined by an escape valve 62 arranged in a tube 63 which connects a branch of the annular conduit 54 with the compression chamber of the compressor.

The valve is held in its closing position by a spring 64 the tension of which may be adjusted by means of a screw 65 in the end of the tube, and it controls the passage of air through a port 66 in the tube, into the central space 46 of the compressor.

It will be readily seen that the escape valve is a most essential part of my improved transmission mechanism inasmuch as it automatically regulates the movement of the transmission in accordance with the resistance which the load on the driven element offers to the actuative movement of the driving element.

Under normal conditions when the transmission rotates in unison with the driving element at a relative velocity which is determined by the proportions of the planet gearing, the valve 62 is closed and the body of compressed air in the chamber acts as an elastic medium which effects the rotative continuity between the cam and the other part of the transmission and which naturally absorbs the violent impulses of the engine.

When the load on the driven element is increased the consequently increased resistance to the rotary movement of the transmission tends to cause an overcompression in the chamber 36 which is immediately relieved by the escape of air past the valve 62.

The air cushion thus absorbs the strain due to the excess resistance and the angular velocity of the cam which connects with the driving element, remains normal under all circumstances.

It will thus be seen that the angular velocity of the transmission is in inverse ratio and the degree of compression of the air body in the chamber 36 in direct ratio to the resistance offered by the load to the rotary movement of the driven shaft of the transmission mechanism, while the driving shaft rotates constantly at a uniform velocity imparted thereto by the source of motive energy with which it is connected.

The tension of the spring which controls the movement of the valve 62 is adjusted in accordance with the power developed by the engine, so that the actuative movement of the latter remains under all circumstances uniform and equable, irrespective of the load on the driven element, any excess resistance of which is absorbed by the air cushion in the compression chamber and dissipated by the opening movement of the escape valve as hereinbefore explained.

The valve in the pipe 51 which connects with the outlet of the compression chamber provides a ready means to control the rotary velocity of the transmission which as hereinbefore explained is dependent on the density of the air cushion in the chamber 36 of the compression element.

When the valve is completely opened, the transmission is idle and its rotary velocity may be regulated to any desired degree by partially or completely closing the passage of air through the pipe by adjustment of the valve, it being understood that the maximum speed of transmission is obtained when the valve is entirely closed.

The valve thus provides a perfect means for controlling the movement of the driven element with relation to the uniform motion of the driving element and the speed of a vehicle to which the transmission is applied may thus be varied to any desired degree without the use of gear shifts or other similar devices.

The valve - controlled pipe connection which communicates with the outlet of the compression chamber furthermore provides means for the delivery of compressed air from a constantly available source for the inflation of tires and other purposes.

The connection between the hereinbefore described elements of the transmission and the driven shaft is designed to increase the angular velocity of the driven shaft with relation to that of the transmission in the same ratio in which the movement of the transmission was reduced relative to the angular velocity of the driving element.

The connection furthermore includes a clutch mechanism which may be adjusted to either break the rotative continuity between the driven shaft and the transmission, or to reverse the rotary movement of the one with relation to that of the other.

With these objects in view, the connection between the driven shaft and the operative elements of the transmission, comprises an internal gear 67 which through the intermediary of a plurality of planet wheels 68 transmits the movement of the before mentioned shaft 53 which connects with the rotary compressor, to a sun wheel 69 connected with the driven shaft 3.

The planet gears are mounted within a drum 70 which is rotatably supported in a bearing 71 by means of a hollow trunnion 72 through which the driven shaft loosely extends.

A tapering sectional bushing 73 interposed between the shaft 3 and the trunnion 72 may be used to take up wear through the medium of a cap 74 which is screwed upon the end of the trunnion.

The planet gearing is disposed within the drum 70 the interior of which is by means of a partition 75 divided into inner and outer compartments.

A disk 76 fixed on the shaft 53 is housed within the outer compartment of the drum in spaced relation to the surface thereof and it carries a plurality of friction clutch members 77 for adjustment to a position in which they engage said surface to establish the rotative continuity of the shaft and the drum.

The friction clutch members consist of levers which are operatively connected with a sliding sleeve 78 on the shaft 53, and a lever 79 fulcrumed upon a suitable stationary support is connected with the sleeve, as shown in Fig. 7, to shift its position for the purpose of moving the blocks 77 into frictional engagement with the interior surface of the drum.

It will be seen that by these means the connection between the driven shaft and the transmission may be made or broken at the will of the operator.

To reverse the direction of rotation of the driven shaft relative to that of the transmission, a band brake 80 is mounted to frictionally engage the peripheral surface of the drum.

When the band brake is disengaged from the drum and the spider clutch is by adjustment of the lever 79 moved into engagement with the same, the driven shaft revolves in unison with the transmission in the direction in which the driving shaft is rotated.

When both the band brake and the spider clutch are disengaged from the drum, the transmission rotates idly without imparting its movement to the driven shaft and when the spider clutch is disengaged from the drum and the band brake is set, the movement of the driven shaft relative to that of the driving shaft is reversed.

Inasmuch as the operation of the rotary transmission and the advantages derived therefrom have been described at intervals in the course of the foregoing description, but little further explanation will be required at this point.

The transmission mechanism is applicable to any machine in which it is desired to transmit the movement of a driving element to a driven part at variable rates of speed.

The air cushion by which the transmission is effected, provides an elastic medium which absorbs shocks to which the driven element may be subjected, or violent impulses of the driving element such as those occurring in an internal combustion engine.

The control valve provides a most reliable means for regulating the velocity of the driven element to any desired degree with relation to the constant angular velocity of the driving element.

The escape valve 62 prevents overloading of the driving element and automatically regulates the movement of the transmission in accordance with the resistance offered by the load and the clutch-mechanism controls the rotative continuity between the transmission and the driven element in either direction.

While I have shown and described my improved transmission in the best form at present known to me, I desire it understood that modifications in the construction and arrangement of its parts may be resorted to within the spirit of my invention as set forth in the following claims:

1. A transmission comprising in combination with a driving-element and a driven-element, two rotary members adapted to conjointly transmit a movement of the one element to the other, and an appliance adapted to effect the rotative continuity of said members, including an air-compressor on one member connected to be operated by action of the other member, an air-chamber connected with said compressor to confine a body of air produced by the operation thereof, an air-intake chamber in connection with said compressor for the admission of air thereto, and a filtering connection between said air-intake chamber and the atmosphere.

2. The combination with a driving element and a driven element, of a mechanism for transmitting a movement of one element to the other, comprising two rotary members, an appliance to effect the rotative continuity thereof through the medium of a body of air under pressure, including an air-chamber, a conduit in communication with said chamber, and a valve at an arbitrary point of said conduit, for regulating the density of a body of air in the chamber, whereby to regulate the relative angular velocities of said members.

3. The combination with a driving element and a driven shaft, of a mechanism for transmitting a movement of said element to said shaft, comprising two rotary members and an appliance adapted to effect the rotative continuity thereof through the medium of a body of air under pressure, one of said members including an internal gear-wheel, a drum mounted for rotation about the driven shaft, a gear-wheel on the driven shaft, a gear-wheel on the drum intermediate of the other gear wheels, and an adjustable, tapering bushing interposed between the driven shaft and the drum for the purpose specified.

4. The combination with a driving element and a driven shaft, of a mechanism for transmitting a movement of said element to said shaft, comprising two rotary members and an appliance adapted to effect the rotative continuity thereof through the medium of a body of air under pressure, one of said members including a gear-wheel fixed with relation to one of said rotary members, a rotary drum, a gear-wheel on the driven shaft, a gear-wheel on the drum intermediate of the other gear-wheels, and a clutch for holding the drum against rotation whereby to reverse the movement of the driven shaft relative to that of the driving element.

5. The combination with a driving shaft and a driven shaft, of a mechanism to transmit the movement of the one to the other, comprising two rotary members, an air-compressor adapted to effect the rotative continuity thereof through the intermediary of an air-body of predetermined density, a conduit on one of said members in driving connection with the driven shaft and communicating with the compressor for the conveyance of air compressed by the operation thereof, a non-rotary, valve-controlled conduit, and a joint connecting said conduits for the passage of air between them.

6. The combination with a driving shaft and a driven shaft, of a mechanism to transmit the movement of the one to the other, comprising two rotary members, an air-compressor adapted to effect the rotative continuity thereof through the intermediary of an air-body of predetermined density, a non-rotary conduit, a controlling-valve therein, and a connection between one of said rotary members and the conduit for the conveyance of air compressed by the operation of the compressor, to said conduit.

7. The combination with a driving element and a driven element, of a transmission comprising a rotary member in driving connection with the driven element, an air-compressor on said member, a rotary cam in operative connection with the air-compressor, a planet-gearing for conveying the rotary motion of the driving element to said cam, a conduit in connection with the compressor for the conveyance of air under pressure, and a controlling valve in said conduit.

8. The combination with a driving-element and a driven element, of a transmission-medium connected with one of them, and including a pressure-chamber, and an air-compressor for the supply of air under pressure to said chamber, comprising a reciprocating piston, a peripherally grooved cam in connection with the other element, and a projection extending loosely in the cam-groove, in connection with the piston.

9. The combination with a driving element and a driven element, of a transmission medium connected with one of them, and including a pressure chamber, an air-compressor for the supply of air under pressure to said chamber, and a rotary cam in driving connection with the compressor and having an internal gear, and a planet-gear comprising planet-wheels on said transmission-medium in coöperative engagement with said internal gear, and a sun-wheel in connection with the other element.

10. The combination with a driving element and a driven element, of a rotary transmission-medium including a pressure chamber, and an air-compressor for the supply of air under pressure to said chamber, a gearing for transmitting the movement of said medium to one of said elements at an increased angular velocity, a cam in driving connection with said compressor, and a gearing for transmitting the movement of the other element to said cam at a reduced angular velocity.

11. The combination with a driving element and a driven element, of a rotary transmission-medium including a pressure-chamber, and an air-compressor for the supply of air under pressure to said chamber, a gearing for transmitting the movement of said medium to one of said elements at an increased angular velocity, clutch-mechanism to secure and break the operative connection between said body and said gearing, a cam in driving connection with said compressor, and a gearing for transmitting the movement of the other element to said cam at a reduced angular velocity.

In testimony whereof I have affixed my signature in presence of two witnesses.

JOHN G. ANDERSON.

Witnesses:
G. J. ROLLANDET,
L. RHOADES.